United States Patent
Tuunanen

(10) Patent No.: US 6,947,541 B2
(45) Date of Patent: Sep. 20, 2005

(54) ENHANCING AN INTELLIGENT NETWORK SERVICE

(75) Inventor: Heikki Tuunanen, Espoo (FI)

(73) Assignee: Nokia Networks Oy, Espoo (FI)

(*) Notice: Subject to any disclaimer, the term of this patent is extended or adjusted under 35 U.S.C. 154(b) by 305 days.

(21) Appl. No.: 09/983,354

(22) Filed: Oct. 24, 2001

(65) Prior Publication Data
US 2002/0048359 A1 Apr. 25, 2002

Related U.S. Application Data

(63) Continuation of application No. PCT/FI00/00355, filed on Apr. 25, 2000.

(30) Foreign Application Priority Data
Apr. 26, 1999 (FI) .................................................. 990939

(51) Int. Cl.[7] .............................................. H04M 7/00
(52) U.S. Cl. .............................. 379/221.08; 379/88.21; 379/93.14; 379/201
(58) Field of Search ....................... 379/211.01, 221.08, 379/88.21, 93.14

(56) References Cited

U.S. PATENT DOCUMENTS

| 4,756,020 A | * | 7/1988 | Fodale .................. 379/114.14 |
| 5,701,412 A | | 12/1997 | Takeda et al. |
| 6,101,250 A | | 8/2000 | Tiainen |
| 6,167,064 A | * | 12/2000 | Cohn et al. .................. 370/522 |

FOREIGN PATENT DOCUMENTS

| WO | WO 97/36431 | 10/1997 |
| WO | WO 98/21899 | 5/1998 |
| WO | WO 99/18706 | 4/1999 |

* cited by examiner

Primary Examiner—Ahmad F. Matar
Assistant Examiner—Marie C. Ubiles
(74) Attorney, Agent, or Firm—Pillsbury Winthrop Shaw Pittman LLP

(57) ABSTRACT

A method for enhancing an intelligent network service and an intelligent network including service switching points and at least one service control point, the intelligent network being adapted to initiate an intelligent network service when detecting at a service switching point a detection point defined by a call state model and triggering a service, and the intelligent network being further adapted to set at the service switching point, as a response to the initiation of an intelligent network service at one of the detection points, one or more detection points to trigger or not to trigger one or more intelligent network services.

15 Claims, 1 Drawing Sheet

ENHANCING AN INTELLIGENT NETWORK SERVICE

This is a continuation International Application No. PCT/FI00/00355, which was filed on Apr. 25, 2000, which published as WO 00/65849, on Nov. 2, 2000, which in turn claims priority from Finland Patent Application No. 990939, which was filed on Apr. 26, 1999, the contents of all of which are incorporated herein by reference.

BACKGROUND OF THE INVENTION

The invention relates to a method for enhancing an intelligent network service and to an intelligent network.

In telecommunications networks intelligence refers to the ability to access stored data, to process the data and to make decisions based on the data. Even the present telecommunications networks, such as the public switched telephone networks PSTN, are to some extent intelligent, since they are capable of processing stored data in routing a call, for instance. A typical 'intelligent' facility in present telecommunications networks is conditional call forwarding in which the call situation must be analysed and the call must be routed on according to the stored call forwarding service profile. Intelligent facilities of this kind have, however, so far been an inseparable part of the basic network and consequently, changing or adding facilities has required software updating, for instance, in all network switching centres.

One example of an intelligent network of this kind is described in the Q-1200 series recommendations of the ITU-T (International Telecommunications Union). The invention and its background is described using the terminology of the ETS 300 374-1 CoreINAP standard, but the invention can also be used in other intelligent networks implemented according to other intelligent network standards.

An intelligent network IN is a network architecture attached to a basic network (fixed or mobile network), which enables a swifter, easier and more flexible implementation and control of services. This is done by moving the control of the services away from the switching centre to a separate intelligent network functional unit. This way, the services can be made independent of the operation of the basic network, and the structure and software of the basic network need not be altered when services are changed or added. In an intelligent network, there can be several service providers in addition to the actual network operator.

The standardisation of intelligent networks has progressed swiftly during the last few years. These standards define a certain functional and hierarchical model for an intelligent network. In this model, the control of services has been moved from the switching centre of the basic network to a service control function (SCF) or a service control point (SCP) in the intelligent network. The service control function contains the service logic and any control related to the service (for instance the necessary database and service logic programs (SLP), in other words, the computer programs which implement the logical structure of a certain service, i.e. the service logic). The service control function can be a solely logical function which can be seen as uniform from the viewpoint of a service switching point SSP. It can be implemented in various ways internally, it can be distributed internally and the service logic related to it can be distributed into different nodes. The service data can also be distributed into other network nodes than the service logic. For instance, the service control function or point (SCF/SCP) can be distributed internally so that it only provides an open interface (such as CORBA, Common Object Request Broker Architecture) to an external server provided by an external service provider. In such a case, the SCP and the external server together form the service control function. Intelligent network services are designed, tested and deleted with special equipment called the service creation environment point (SCEP). A service management function (SMF) is used to manage the data relating to the users and the network in the database, including service-specific data and service programs. The service switching point (SSP) is typically a switching centre, a switching centre of the basic network, for instance, which executes a service switching function (SSF), i.e. identifies the intelligent network service and initiates interworking with the service control point SCP, but the SSP can also be a network element of another kind, such as the node responsible for the establishment of the connection in a VoIP protocol (Voice IP), i.e. a H.323 Gatekeeper. When a call including an intelligent network service is made, the service switching point SSP takes care of the connection arrangements. The intelligent network service is provided by initiating an intelligent network service when detecting detection points (DP) related to services, at which time the service switching point SSP requests instructions from the service control point SCP. In other words, the SSP hands over the control to the SCP and waits for operations from the SCP. When an intelligent network service is triggered at the service control point SCP, the service logic program SLP is initiated, whose operation determines the instructions which the SCP sends to the SSP in each call phase. The SSP interprets the received instructions and begins the call control functions required by them. Triggering an intelligent network service thus refers to the initiation of an intelligent network function due to an input created when a certain identification condition is met.

The above describes the present structure of intelligent networks. In this application, an intelligent network refers generally to a solution in which a node switching a call, a session or packet data contacts the service control function which provides the node in question instructions affecting the switching of the call, session or packet data. The contact between the node in question and the service control function is based on the service trigger data in the node. Triggerings, state models and a protocol providing controls or API interface between the control function and the network switching node characterize an intelligent network. Call, session or packet data switching can be described with a state model visible to the control function, the state model comprising phases and detection points associated with them, at which the processing can be interrupted to wait for instructions from the control function. Controls and operations can also be procedures directed at call objects and event notifications associated with them.

The services of an intelligent network are thus initiated at detection points defined by the basic call state model (BCSM) describing the operation of call control. The meeting order of the detection points is determined according to each call case. This is why services which are required in several different call cases must sometimes be defined to initiate at several different detection points. For instance, a service which reroutes a call in case of a failure must sometimes be set to initiate at detection points Busy, No_Answer and Route_Select_Failure. The above detection points are then set as trigger points. When the call control proceeds to one of these detection points, the service in question is initiated.

A problem with the above arrangement is that if in the case of the example given the service is initiated at the Busy detection point, for instance, the No_Answer and Route_Select_Failure detection points still remain active trigger points. If these detection points are detected later, it is possible that the same service is re-initiated in vain. Such a case is especially probable in the intelligent network according to the CoreINAP (Intelligent Network Application Protocol) CS3 (Capability Set 3) being developed in the ETSI (European Telecommunication Standard Institute) SPS3 work group and the ITU. According to plans, it will be possible for this intelligent network to have several controlling connections (MPC, Multiple Point of Control support) for one call state model to the service control point which correspondingly has several active service logic programs. It should be noted that the invention can be applied to an intelligent network according to any intelligent network standard (such as ANSI, AIN or WIN) providing MPC support. If the service logic programs activated for one call state model are completely independent, they have no knowledge of the services initiated by the others and thus may unknowingly re-initiate an already active service in vain.

BRIEF DESCRIPTION OF THE INVENTION

It is thus an object of the invention to develop a method and an arrangement implementing the method in order to solve the above problems. The object of the invention is achieved by a method for enhancing an intelligent network service, the intelligent network comprising service switching points and at least one service control function, and the intelligent network service being initiated when detecting at a service switching point a pre-defined call event or a detection point defined by a call state model and triggering a service, whereby the method is characterized by setting one or more detection points or call events at a service switching point to trigger or not to trigger one or more intelligent network services as a response to the initiation of an intelligent network service after detecting a detection point or call event.

The invention is based on the idea that when initiating an intelligent network service, one or more detection points or call events are set to trigger or not to trigger the intelligent network service in question or other intelligent network services. By means of the invention, all detection points or call events triggering the intelligent network service in question can, if necessary, be set not to trigger the service, for instance.

The method of the invention provides the advantage that an erroneous or unnecessary initiation of an intelligent network service can be prevented by means of it. In addition, by means of the invention, the services triggered at various detection points or call events can be controlled on the basis of which services have been triggered at detection points or call events detected earlier. The invention also provides the advantage that there is less traffic between the service switching point and the control function. Even though the service control point did detect that the service had already been initiated, this causes an unnecessary contact between the service switching point to the control function, if the service switching point requests instructions from the service control point, and the call set-up is delayed. When instead the unnecessary initiation of services, for instance, is already prevented at the switching point, any unnecessary contacts between the switching point and the control function can be avoided. In this application, the term 'call' not only refers to conventional calls, but also to other, possibly virtual, connection states comprising conveying of user data, such as a data session or conveying of packet data. Examples include a packet radio session (such as a GPRS session), a VoIP session and a multimedia session according to the H.323.

The invention also relates to an intelligent network comprising service switching points and at least one service control point, and the intelligent network being adapted to initiate an intelligent network service when detecting at a service switching point a pre-defined call event or a detection point defined by a call state model and triggering a service, whereby the intelligent network is characterized in that it is adapted to set one or more detection points or call events at a service switching point to trigger or not to trigger one or more intelligent network services as a response to the initiation of an intelligent network service at a detection point or call event. The advantages provided by the method of the invention can be achieved by means of an intelligent network of this kind.

BRIEF DESCRIPTION OF THE FIGURES

In the following, the invention will be described in greater detail by means of preferred embodiments and with reference to the attached drawings, in which.

DETAILED DESCRIPTION OF THE INVENTION

Figure 1:
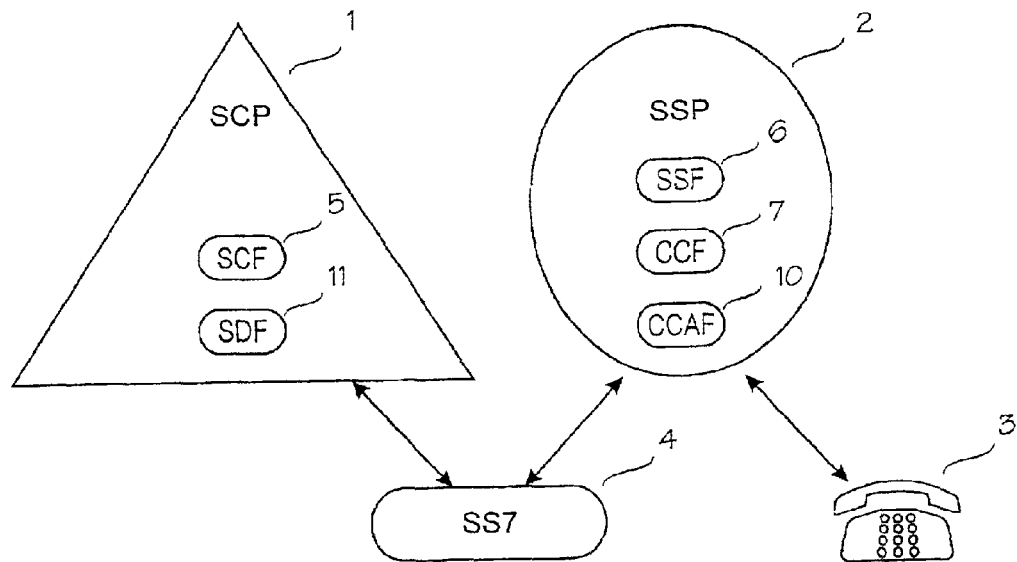
FIG. 1 shows the structure of an intelligent network.
Figure 2:
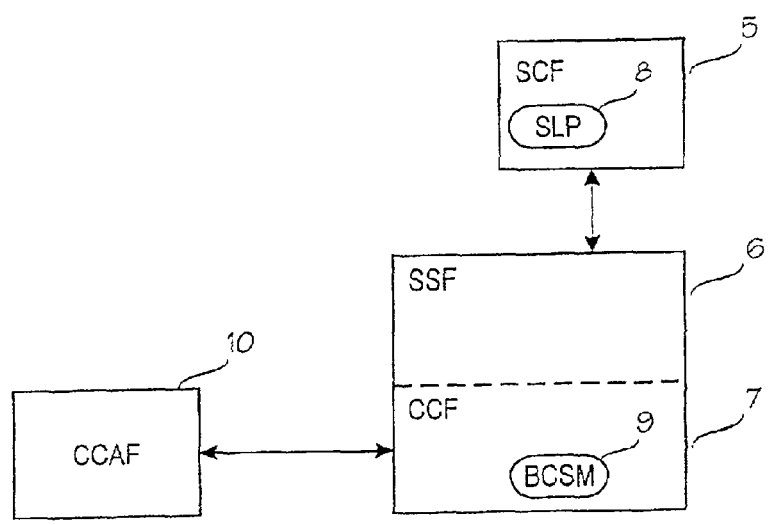
FIG. 2 shows the connections between the functions of the intelligent network.

FIG. 1 shows the elements and functions essential for the intelligent network services, and FIG. 2 shows the interconnection of the intelligent network functions. It should be noted that the figures only show the elements necessary for understanding the invention. The structure of the intelligent network may also differ from the above without any relevance to the basic idea of the invention. Network elements comprising a service switching function 6 (SSF) and a call control function 7 (CCF) are referred to as service switching points 2 (SSP). The call control function CCF 7 is not a function related to the intelligent network, but a standard function of switching centres comprising high-level call processing functions of the switching centre, such as transmission link set-up and release. The service switching function SSF 6 is an interface between the call control function CCF 7 and the service control function SCF 5. The SSF 6 interprets the requests sent by the SCF 5 and forwards them to the CCF 7 which starts the call control functions required by them. Correspondingly, the call control function CCF 7 uses the SSF 6 to request instructions from the SCF 5. The SSF 6 has a fixed connection to the CCF 7 and acts as its interface. Thus, each SSF 6 is together with the CCF 7 in the same switching centre. The service switching point SSP 2 in FIG. 1 is, for instance, an exchange comprising not only the CCF 7 and the SSF 6, but also a function 10 (CCAF, Call Control Agent Function) providing users 3 access to the network. Since the SSP 2 comprises the CCAF 10, it can, for instance, be a local exchange of a fixed network or a mobile switching centre controlling the base station subsystem BSS of a mobile network PLMN. The terminal equipment of the user 3 can thus be a telephone, a company exchange with telephones or a mobile station communicating over an air interface and its supporting equipment.

Network elements comprising a service control function 5 (SCF) are referred to as service control points 1 (SCP). The service control function 5 is a centralised authority in the intelligent network comprising an execution environment for service logic programs 8, for instance. Each program 8 can have several instances to execute. The service control point SCP 1 in FIG. 1 may in addition to the service control function SCF 5 also comprise a service data function 11 (SDF), for instance. The SDF 11 is a database used through the SCF 5. The service logic programs 8 can request and update the data in the SDF 11. Subscriber-specific or service number-specific data, for instance, can be stored in the SDF 11.

One service control point SCP 1 can have several service switching points SSP 2 connected to it and correspondingly, one service switching point SSP 2 can be connected to several service control points SCP 1. Several SCPs 1 can contain the same service logic program 8 and the same data or a connection to the same data to improve the reliability of the network and to divide the load of the network.

In some network nodes, the service switching point SSP and the service control point SCP have been combined. This kind of a network node is called a service switching and control point SSCP (not shown in figures). It comprises both the SSP and SCP functions and provides similar services as the corresponding individual points together.

In the system of FIG. 1, the elements are connected to each other through a signalling network SS7 4 (Signalling System Number 7, a known signalling system described in the CCITT (currently ITU-T) recommendations). Other networks, such as the ISDN, can also be used. In communicating with each other, the switching point 2 and the control point 1 use, for instance, the INAP protocol (Intelligent Network Application Protocol, described in the ETSI standard ETSI IN CS1 INAP Part 1: Protocol Specification, prETS 300 374-1). In the SS7 protocol stack, the INAP layer is the top one with the TCAP layer (Transaction Capabilities Application Part), the SCCP layer (Signalling Connection Control Point) and the MTP layer (Message Transfer Part) below it.

When a call including an intelligent network service is set up, the service switching point SSP 2 takes care of the connection arrangements. The intelligent network service is provided by initiating an intelligent network service when detecting detection points (DP) related to services, at which time the service switching point SSP 2 requests instructions from the service control point SCP 1. In other words, the SSP 2 hands over the control to the SCP 1 and waits for operations from the SCP 1. When an intelligent network service is triggered, the service control point SCP 1 initiates the service logic program SLP 8 whose operation determines the instructions which the SCP 1 sends to the SSP 2 in each call phase. The SSP 2 interprets the received instructions and begins the call control functions required by them. Triggering an intelligent network service thus refers to the initiation of an intelligent network function due to an input created when a certain identification condition is met, i.e. intelligent network services are initiated at the detection points set as trigger detection points (TDP) and defined by the call state model 9 (BCSM) describing the operation of call control.

According to the primary embodiment of the invention, the service switching point 2 sets, when initiating an intelligent network service, one or more detection points to trigger or not to trigger one or more intelligent network services. According to one preferred embodiment of the invention, information on the detection points which have been set to trigger the intelligent network service in question and/or other intelligent network services is attached to the intelligent network service, to the intelligent network service trigger data, for instance, whereby the setting of the detection points at the service switching point as a response to the initiation of an intelligent network service at one of the detection points occurs by means of said detection point information attached to the intelligent network service being initiated. The trigger data of an intelligent network service is the information according to which the service switching point 2 functions as it initiates an intelligent network service when detecting detection points (DP) and which, for instance, contains information on the control point 1 address, for instance, to which notification on detecting the detection point should be sent. The invention can be implemented so, for instance, that a special parameter is added to said trigger data, stating the necessary information on the triggering detection points.

According to a preferred embodiment of the invention, a parameter is added to the intelligent network service trigger data, indicating all the detection points, for instance, that have been set to trigger the intelligent network service. When the intelligent network service is initiated, the service switching point 2 checks the trigger data to see, if the intelligent network service is set to initiate from several detection points and if so, it sets the other detection points not to trigger the intelligent network service in question. This way, the same intelligent network service is not re-initiated unnecessarily, if other detection points originally set to initiate the service in question are detected later during the call.

According to yet another embodiment of the invention, information is attached to the intelligent network service, to the intelligent network service trigger data, for instance, on the intelligent network services whose initiation is to be prevented or allowed as a response to the initiation of said intelligent network service, and from the call state model 9, for instance, as a response to the initiation of an intelligent network service at one of the detection points, information is retrieved on the detection points that have been set to trigger said intelligent network services whose initiation is to be prevented or allowed. After this, the detection points can be set at the service switching point 2 as a response to the initiation of an intelligent network service at one of the detection points on the basis of said retrieved information so that the future initiation of one or more intelligent network services is prevented or allowed according to the information attached to the intelligent network service.

Other kinds of control measures can also be performed at the service switching point 2 by means of the invention. The various services can be controlled according to what services have been initiated earlier by setting at the service initiation stage detection points to trigger or not to trigger the service being initiated or possibly other services. Information on the detection points, for instance, attached to the intelligent network service, to its trigger data, for instance, can contain information on what to do with the detection points in question, when the intelligent network service is initiated. Alternatively, it is possible to act according to a pre-defined procedure so, for instance, that when the intelligent network service is initiated, all detection points set to trigger the intelligent network service in question are set not to trigger it, as described in the above example.

In a mobile system, the structured trigger data according to the invention can be stored in subscriber registers from which they are transferred to a switching point, such as a mobile switching centre. The trigger data can, for instance, permanently be in the subscriber's home location register from which they are transferred to a visitor location register (which is associated with the mobile switching centre), when necessary.

The invention has been described above with examples in which detection points are used to trigger the intelligent service. However, in some intelligent network solutions (such as Camel, Customised Applications for Mobile network Enhanced Logic), trigger data can be defined not only to detection points, but also to events related to a session or a call and independent of the detection points. The service switching point SSP reports these events immediately to the service control function SCF in a notification regardless of what the state model point in call (PIC) is and of whether a detection point has been reached or not. The notifications can be unidirectional notifications to the service control function. Currently, events independent of detection points include the activation of standard GSM supplementary services, such as call transfer, call hold and multiparty. The events could also include changes in the use of radio resources, changes in the transmission rate or service quality, or handover.

According to the invention, information on the events whose notification is to be prevented can be added to the initiation of a service, for instance. If the same events are defined for notification to several identified services, information on the services to which notification is not to be sent on the listed events can be preferably attached to the initiation of a service. In other words, the same principles and solutions described above in connection with detection points can be applied to events and notifications, and in practice, these two triggering methods are used in parallel.

It is obvious to a person skilled in the art that while technology advances, the basic idea of the invention can be implemented in many different ways. The invention and its embodiments are thus not restricted to the examples described above, but can vary within the scope of the claims.

What is claimed is:

1. A method for enhancing an intelligent network service, the intelligent network comprising service switching points and at least one service control function, the method comprising:
    initiating the intelligent network service when detecting at a service switching point a pre-defined call event or a detection point defined by a call state model and triggering a service; and
    setting, as a response to the initiation of an intelligent network service after detecting a detection point or call event, one or more detection points or call events at a service switching point to trigger or not to trigger one or more intelligent network services.

2. The method of claim 1, further comprising attaching, to an intelligent network service information on the detection points or call events which have been set to trigger, at least one of the intelligent network service in question or other intelligent network services, whereby the setting of the detection points or call events at the service switching point as a response to the initiation of an intelligent network service at one of the detection points or call events occurs using said detection point or call event information attached to the intelligent network service being initiated.

3. The method of claim 2, wherein the initiation of the intelligent network service occurs according to the intelligent network service trigger data included in the service switching point, whereby information on detection points or call events is attached to the trigger data of the intelligent network service and the setting of the detection points or call events occurs using the trigger data of the intelligent network service being initiated.

4. The method of claim 1, 2 or 3, further comprising setting, when an intelligent network service is initiated, all detection points or call events not to trigger said intelligent network service.

5. The method of claim 1, further comprising:
    attaching, to the intelligent network service, information on the intelligent network services whose initiation is to be prevented or allowed as a response to the initiation of said intelligent network service; and
    retrieving, from the call state model, as a response to the initiation of an intelligent network service at one of the detection points or call events, information on the detection points or call events which have been set to trigger said intelligent network services whose initiation is to be prevented or allowed, whereby the setting of the detection points or call events at the service switching point, as a response to the initiation of an intelligent network service in one of the detection points or call events, occurs using said retrieved information.

6. The method of claim 5, wherein the initiation of the intelligent network service occurs according to the intelligent network service trigger data included in the service switching point, whereby information on the intelligent network services whose initiation is to be prevented or allowed, as a response to the initiation of said intelligent network service, is attached to the intelligent network service trigger data.

7. The method of claim 1, 2, 3, 5 or 6, wherein
    the service switching point sends a notification to the service control function when it detects a triggering call event, whereby the notification initiates an intelligent network service at the service control point, and
    setting the call event to non-triggering prevents the sending of the notification.

8. An intelligent network comprising:
    service switching points; and
    at least one service control function;
    the intelligent network being adapted:
        to initiate an intelligent network service when detecting at a service switching point a pre-defined call event or a detection point defined by a call state model and triggering a service, and
        to set at the service switching point, as a response to the initiation of an intelligent network service after detection of a detection point or call event, one or more detection points or call events to trigger or not to trigger one or more intelligent network services.

9. The intelligent network of claim 8, wherein the intelligent network is further adapted to attach, to an intelligent network service, information on the detection points or call events that have been set to trigger at least one of the intelligent network service in question or other intelligent network services, whereby the intelligent network is adapted to set the detection points or call events at the service switching point using said detection point or call event information attached to the intelligent network service being initiated as a response to the initiation of an intelligent network service at one of the detection points.

10. The intelligent network of claim 9, wherein the initiation of the intelligent network service occurs according to the intelligent network service trigger data included in the service switching point, whereby the intelligent network is adapted to attach information on the detection points or call events to the intelligent network service trigger data and to set the detection points or call events using the trigger data of the intelligent network service being initiated.

11. The intelligent network of claim 8, 9 or 10, wherein the intelligent network is further adapted to set all detection points or call events not to trigger an intelligent network service when said intelligent network service is initiated.

12. The intelligent network of claim 8, wherein the intelligent network is further adapted to attach to the intelligent network service information on the intelligent network services whose initiation is to be prevented or allowed as a response to the initiation of said intelligent network service, and to retrieve from the call state model, as a response to the initiation of an intelligent network service at one of the detection points or call events, information on the detection points or call events which have been set to trigger said intelligent network services whose initiation is to be prevented or allowed, whereby the intelligent network is adapted to set the detection points or call events at the service switching point as a response to the initiation of an intelligent network service in one of the detection points or call events using said retrieved information.

13. The intelligent network of claim 12, wherein the initiation of the intelligent network service occurs according to the intelligent network service trigger data included in the service switching point, whereby the intelligent network is adapted to attach information on the intelligent network services whose initiation is to be prevented or allowed as a response to the initiation of said intelligent network service, to the intelligent network service trigger data.

14. The intelligent network of claim 8, 9, 10, 12 or 13, wherein the service switching point sends, to the service control function, a notification when the service switching point detects a triggering call event, whereby the notification initiates the intelligent network service at the service control point, and setting the call event to non-triggering prevents the sending of the notification.

15. A network element comprising an intelligent network service switching point, the service switching point being configured:

to initiate an intelligent network service when detecting a predefined call event or a detection point defined by a call state model and triggering a service, and to set, as a response to the initiation of an intelligent network service after detection of a detection point or call event, one or more detection points or call events to trigger or not to trigger one or more intelligent network services.

* * * * *